Sept. 9, 1969    F. P. CLAY, JR., ET AL    3,466,484
IONIZATION VACUUM GAUGE WITH ALL BUT THE
END OF THE ION COLLECTOR SHIELDED
Filed April 27, 1967

INVENTORS
FORREST P. CLAY, JR.
LEONARD T. MELFI, JR.

BY

ATTORNEYS 3,466,484
IONIZATION VACUUM GAUGE WITH ALL BUT
THE END OF THE ION COLLECTOR SHIELDED
Forrest P. Clay, Jr., Norfolk, and Leonard T. Melfi, Jr.,
 Williamsburg, Va., assignors to the United States of
 America as represented by the Administrator of the
 National Aeronautics and Space Administration
Filed Apr. 27, 1967, Ser. No. 635,326
Int. Cl. H01j 7/16, 13/28, 17/24
U.S. Cl. 313—7                                              10 Claims

ABSTRACT OF THE DISCLOSURE

The invention is an ionization vacuum gage of the hot filament type having the ion collector buried or completely removed from the grid structure of the gage. A shield is located between the grid structure and the ion collector which reduces the number of X-ray incident on the collector. The end of the grid opposite the ion collector is closed in one embodiment and in another embodiment an ion collector and shield are positioned at both ends of the grid structure.

---

The invention described herein was made by an employee of the United States Government and may be manufactured and used by or for the Government for governmental purposes without the payment of any royalties thereon or therefor.

This invention relates to an ionization vacuum gage of the general Bayard-Alpert type, and more particularly to a modification of the Bayard-Alpert gage wherein the ion collector is buried and shielded from the electron collector or grid.

Various types of ionization gages are presently manufactured for measuring pressure in a vacuum pressure system.

One such type is known in the art as a cold cathode gage. This type of gage has a sustained discharge leading to a high sensitivity, but is subject to erratic behavior, mode changes, and is often nonlinear below approximately $2 \times 10^{-10}$ torr. The cold cathode gage is also quite expensive to manufacture.

Two types of prior art Bayard-Alpert hot filament gages are currently in use, one type has an open end grid system and another type a closed end grid structure. The closed end gages have an X-ray limit of approximately $14^{-11}$ torr and can be effectively cleaned only by electron bombardment procedures. The open end types have X-ray limits in the low $10^{-10}$ torr range. This type of gage, however, is most frequently used because of its operational simplicity and the possibility of using resistance heating for removing gases absorbed on the gage elements.

The mass spectrometer can also be utilized for measuring pressure in a vacuum system providing good results; however, this equipment is extremely expensive and difficult to utilize because of its complexity and physical size.

The present invention overcomes the above difficulties by utilizing a hot filament gage with a buried ion collector that is shielded. With proper positioning and design of the ion collector and shield a gage having good sensitivity and an X-ray limit of at least one decade lower than similar gages is readily obtainable.

It is, therefore, an object of this invention to provide an ionization vacuum gage which has an X-ray limit of at least $3 \times 10^{-12}$ torr.

Still another object of this invention is to provide an ionization vacuum gage of the hot filament type which has good sensitivity.

Yet another object of the invention is to provide an ionization gage which has a buried ion collector.

An additional object of the invention is to provide an ionization gage wherein the ion collector is shielded from the grid structure.

A further object of the invention is to provide an ionization gage which has a buried ion collector at both ends of an open grid structure.

An added object of the invention is to provide an ionization gage which is simple to use, economical to construct and is easy to maintain through repeated usage.

These and other objects and advantages of the invention will become more apparent when considered with the accompanying drawings.

Figure 1:
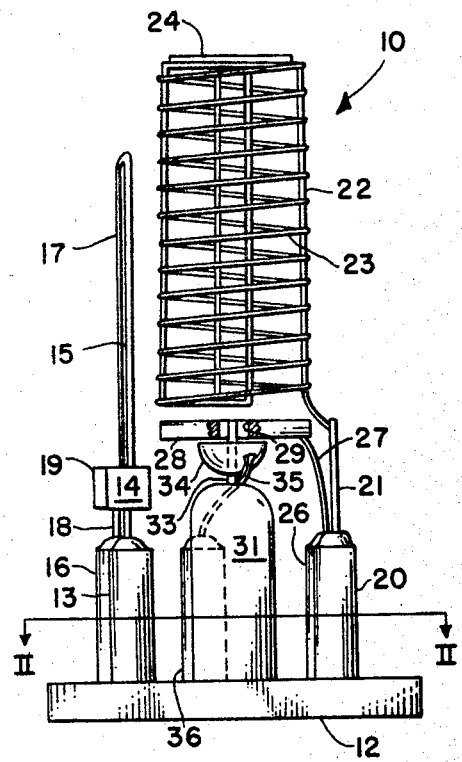
FIG. 1 is a perspective view of a nude ionization gage utilizing a single buried ion collector.

Referring now more specifically to the details of the invention, FIG. 1 shows an ionization gage designated generally by the reference numeral 10.

The gage 10 has a base or support structure 12 which is made of some type of insulating material surrounded by a metal flange. The support 12 may be provided with apertures or other structure to facilitate connecting the gage to a wall of a vacuum system wherein measurements are to be made. The gage may be termed a nude ionization gage in that the elements of the gage are exposed to the vacuum as opposed to being encased in glass or the like.

Fixed to the support 12 in a conventional manner is a ceramic feed through 13. The ceramic feed through houses and supports a filament post 15. The filament post 15 has a leg or arm directed at an angle therefrom. A clamp 14 may be used for positioning and removing the post which is in two pieces. Another ceramic feed through 16 is located on the support 12 adjacent the ceramic feed through 13. It carries a filament hanger 18 which may also be of a two piece nature joined by a clamp 19. The filament 17 is connected between the hanger 18 and the leg of the post 15. The filament is connected to a source of power in a conventional manner, whereby the filament may be heated to give off electrons similar to other prior art arrangements.

Spaced from the ceramic feed through 13 is a ceramic standard 20 which is also carried by support 12 in a conventional manner. A grid brace 21 is carried by the ceramic standard and supports a grid cage 22 which is fixed thereto by means such as tack welding. The grid cage 22 consists of a pair of U-shaped wires which are positioned perpendicularly with respect to each other and joined at their midpoints. The grid 23 is constructed of a coil of wire or a wire wound about the cage and fastened thereto at equally spaced intervals by means such as tack welding. The grid wire extends from the lower extremity of the cage to a position adjacent the top of cage. The grid cap or closure 24 is made of a wire which is attached to the connection point of the cage and wound spirally outward covering the end of the grid structure. The wire is tacked to the cage at contact points with the cage structure as it spirals radially to the outer extremity of the cage. The grid is connected to circuitry in and of a conventional manner.

Another ceramic standard 26 is located adjacent the ceramic standard 20 and is carried by the support 12. This standard supports the shield bracket 27. The shield bracket has fixed thereto a shield 28 having an aperture 29. The shield 28 is a disc or plate-like object located immediately under the grid 23.

Figure 2:
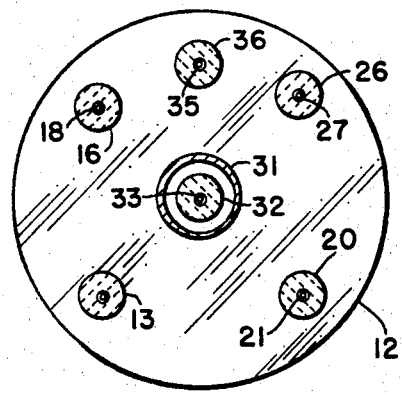
FIG. 2 is a cross sectional view taken along the section lines II—II of FIG. 1.

Centrally located on support 12 is a metal housing 31 and within this housing is a ceramic column 32 (FIG. 2). This ceramic column 32 supports the ion collector 33 which is in the form of a fine wire projecting through a small hole in the metal housing 31. The end of ion collector 33 terminates at a point just at the upper surface of the shield 28 and is considered to be buried due to this position with respect to the grid structure. A focusing cup 34 surrounds the ion collector 33 and is supported by locating strap 35 fixed to the cup and to another ceramic column 36 also carried by the support 12. The ceramic column 36 is also used to support the other side of the grid cage 22, the particular structure not being shown.

Figure 3:
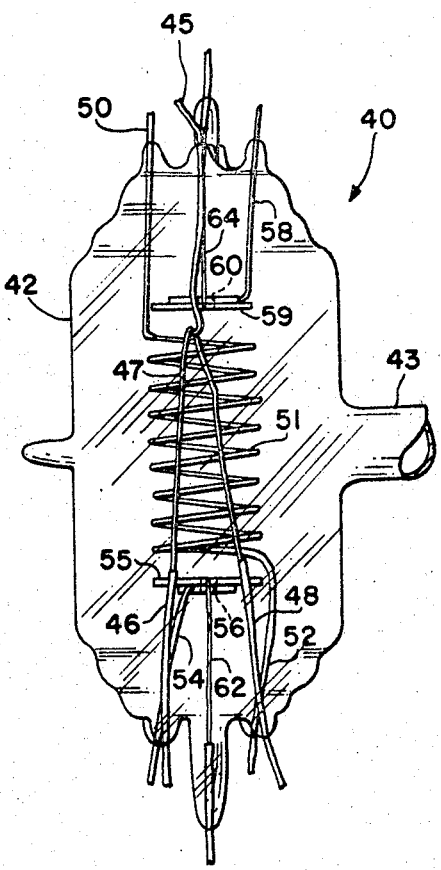
FIG. 3 is a perspective view of an ionization gage utilizing an ion collector at both ends of the grid structure.

A modified form of the invention is shown in FIG. 3 and is designated generally by the reference numeral 40. The FIG. 3 embodiment is similar in structural elements to the FIG. 1 embodiment except an additional ion collector is utilized, and the structure is enclosed in a glass or equivalent encasement.

The basic structure of the ionization gage 40 is a bulb or glass-like encasement 42. The bulb 42 is generally circular in cross section and is somewhat longer than it is wide. An attachment port 43 is formed in the side of the bulb, the part being utilized for connecting the gage to a vacuum system.

The ends of the bulb are closed and have glass to metal feed throughs of a conventional type which are used to support the various structural elements of the gage.

Held by one of these feed throughs is a filament hanger 45 which is in the form of a wire, the end of the wire projecting into the bulb and having a hook or L-shaped end. A feed through at the other end of the bulb supports a filament lead 46, and another feed through adjacent thereto supports a filament lead 48. The filament 47 is a fine wire which connects to the filament lead 46 is entrained over the leg of the filament hanger 45 and connects to the filament lead 48.

Another feed through on the bulb locates grid supply wire 50, and at the opposite end a feed through supports a grad exit wire 52. The ends of these wires project a partial distance into the bulb, and the grid 51, which is a wire coil, joins the respective wires.

Still another feed through on one end of the bulb supports a lower shield bracket 54 that is merely a piece of stiff wire. The end of this wire may be looped to form a platform on which the lower shield 55 is attached. The shield 55 is located immediately below the last turn of the grid coil. The shield 55 has a centrally disposed aperture 56 which allows passage of ions for purposes to be explained more fully hereinafter.

A similar structure is associated with the other end of the bulb. An upper shield bracket 58, is supported by a feed through and projects to the vicinity of the last turn of the upper extremity of the grid coil. The end of the upper shield bracket may also be looped to form a platform for the shield 59 which is connected thereto in a conventional manner such as by tack welding. The shield 59 has an aperture designed to allow passage of ions, attracted by an ion collector now to be described.

A centrally disposed feed through on the lower end of the bulb carries and posititions the ion collector 62. The ion collector 62 is a fine wire which projects through the shield aperture 56 to a point event with the upper surface of the shield 55.

A similar arrangement is provided at the other end of the bulb wherein the ion collector 64 is retained and positioned by a centrally located feed through formed on that end of the bulb. Again, the ion collector projects into the bulb and through the shield aperture 60 to a point flush with the lower surface of the shield 59.

Operation

The basic operation of the above described gages is similar to that of a conventional hot filament ion gage. A negative potential with respect to the filament is applied to the ion collector and a positive potential to the grid. Electrons emitted from the filament are accelerated by the grid potential. These electrons move about the tube causing ionization of gas within the tube. The ion collector is at a potential negative to that of the filament resulting in a flow of ions to the ion collector. The current produced by these ions is measured giving an indication of degree of vacuum within the system.

As with other ionization gages, the gages are limited by the effect on the ion collector of X-rays produced by electrons impinging on the grid.

Utilizing the structure of this invention it has been found that the X-ray target size is reduced by a factor of approximately 20 as compared with the standard Bayard-Alpert gage. These tests have further shown that the sensitivity of the gages is 25 torr$^{-1}$ as represented by the equation of $$K = \frac{i^+}{i^- P}$$

wherein $i^+$ is ion current in amperes, $i^-$ is electron current in amperes, and P is pressure in torr.

The lowest nitrogen equivalent pressure measured by utilizing the gages has been $3 \times 10^{-12}$ torr. The tests would seem to indicate however that the measurement was limited by the capability of the facility, with lower limits being attainable.

It is thus apparent that the ionization gages of this invention can indicate pressures at least one dedcade lower than existing gages of a similar type due to the reduction in its X-ray currents. The gages are easy to construct and operate. Essential elements of the gage in form 40 can be resistant heated for outgassing, this being a major consideration in determining the marketability of total pressure high vacuum gages. The gage also remains linear to low pressure levels.

While a preferred embodiment of this invention and a modification thereof has been described, it will be understood that other modifications and improvements may be made thereto. Such of these modifications and improvements as incorporate the principles of this invention are to be considered as included in the hereinafter appended claims.

What is claimed as new and desired to be secure by Letters Patent of the United States is:

We claim:

1. An ionization vacuum gage comprising:
    a support;
    grid means carried by said support;
    filament means carried by said support and located adjacent said grid means;
    ion collector means carried by said support and being buried or located outside structure of the grid means; and
    means for shielding all but the extremity of said ion collector means from X-rays discharged by said grid means; said collector means being a slender member having its extremity generally in the same plane as the shielding means.

2. An ionization vacuum gage as in claim 1 wherein means closes one end of the grid means.

3. An ionization vacuum gage as in claim 2 wherein said means for closing the end of the grid means is a series of wires.

4. An ionization vacuum gage as in claim 1 wherein said grid means is a coil of fine wire; and said ion collector means being centered below said grid means.

5. An ionization vacuum gage as in claim 1; wherein said ion collector means collects ions about its extremity.

6. An ionization vacuum gage as in claim 1 wherein said shield means is a plate having an aperture located between said grid means and ion collector means.

7. An ionization vacuum gage as in claim 1 wherein said grid means is a coil of fine wire;
said ion collector being a fine wire the end of which is centered below the grid means, said shield being a disc located between the grid and the ion collector; and
said disc having an aperture exposing only the end of the ion collector whereby ions are collected at the extremity of the ion collector.

8. An ionization vacuum gage comprising:
a support;
grid means carried by said support;
filament means carried by said support and located adjacent said grid means;
ion collector means carried by said support and located adjacent said grid means;
said ion means including separate ion collectors located above and below the physical structure of the grid means; and
means for shielding said ion collector means from said grid means.

9. An ionization vacuum gage as in claim 8 wherein said shield means includes separate shields for shielding the separate ion collectors.

10. An ionization vacuum gage as in claim 9 wherein said ionization gage structure is encased in and supported by a bulb.

References Cited

UNITED STATES PATENTS

| | | | |
|---|---|---|---|
| 3,310,699 | 3/1967 | Torney | 313—7 |
| 3,341,727 | 9/1967 | Schuemann | 324—33 X |
| 3,394,286 | 7/1968 | Brock | 313—7 X |
| 3,394,301 | 7/1968 | Van Oostrom | 324—33 |

JAMES W. LAWRENCE, Primary Examiner

C. R. CAMPBELL, Assistant Examiner

U.S. Cl. X.R.

315—108; 324—33